(12) United States Patent
Woodell et al.

(10) Patent No.: US 7,973,698 B1
(45) Date of Patent: Jul. 5, 2011

(54) SYSTEM AND METHOD FOR USING A RADAR TO ESTIMATE AND COMPENSATE FOR ATMOSPHERIC REFRACTION

(75) Inventors: Daniel L. Woodell, Cedar Rapids, IA (US); Roy E. Robertson, Marion, IA (US); Nathanael A. Meyer, Coralville, IA (US); Gregory J. Koenigs, Cedar Rapids, IA (US); Venkata A. Sishtla, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 7 days.

(21) Appl. No.: 12/239,546

(22) Filed: Sep. 26, 2008

(51) Int. Cl.
*G01S 13/95* (2006.01)

(52) U.S. Cl. ..................................... 342/26 B

(58) Field of Classification Search .................. None
See application file for complete search history.

(56) References Cited

U.S. PATENT DOCUMENTS

| | | | |
|---|---|---|---|
| 2,930,035 A | 3/1960 | Altekruse | |
| 2,965,894 A | 12/1960 | Sweeney | |
| 2,994,966 A | 8/1961 | Senitsky et al. | |
| 3,153,234 A | 10/1964 | Begeman et al. | |
| 3,212,088 A | 10/1965 | Alexander et al. | |
| 3,241,141 A | 3/1966 | Wall | |
| 3,325,807 A | 6/1967 | Burns et al. | |
| 3,397,397 A | 8/1968 | Barney | |
| 3,404,396 A * | 10/1968 | Buchler et al. | 342/26 B |
| 3,739,380 A | 6/1973 | Burdic et al. | |
| 3,815,132 A | 6/1974 | Case, Jr. et al. | |
| 4,027,237 A * | 5/1977 | Heile | 324/636 |
| 4,050,067 A * | 9/1977 | Elmore, Jr. | 342/191 |
| 4,093,918 A * | 6/1978 | Hitney | 702/2 |
| 4,649,389 A * | 3/1987 | Taylor et al. | 342/123 |
| 4,760,396 A | 7/1988 | Barney et al. | |
| 5,945,926 A | 8/1999 | Ammar et al. | |
| 6,667,710 B2 * | 12/2003 | Cornell et al. | 342/26 R |
| 6,731,906 B2 * | 5/2004 | Sokolovskiy et al. | 455/12.1 |
| 6,833,805 B1 * | 12/2004 | Belen'kii et al. | 342/26 D |
| 6,853,331 B1 * | 2/2005 | Belen'kii et al. | 342/159 |
| 7,307,583 B1 * | 12/2007 | Woodell et al. | 342/173 |
| 7,365,674 B2 * | 4/2008 | Tillotson et al. | 342/26 B |
| 7,667,635 B2 * | 2/2010 | Tillotson | 342/26 B |
| 7,733,264 B1 * | 6/2010 | Woodell et al. | 342/26 B |
| 2003/0016155 A1 * | 1/2003 | Szeto et al. | 342/26 |
| 2010/0052978 A1 * | 3/2010 | Tillotson | 342/26 B |

* cited by examiner

*Primary Examiner* — Thomas H Tarcza
*Assistant Examiner* — Matthew M Barker
(74) *Attorney, Agent, or Firm* — Matthew J. Evans; Daniel M. Barbieri

(57) ABSTRACT

An aircraft weather radar system includes an input for receiving data associated with weather radar returns received by an antenna. The aircraft weather radar system further includes processing electronics for performing a routine to analyze radar returns associated with terrain. The processing electronics are configured to determine atmospheric refraction characteristics based on a range and/or an angle to terrain. The routine is based on the determination of atmospheric refraction characteristics.

15 Claims, 14 Drawing Sheets

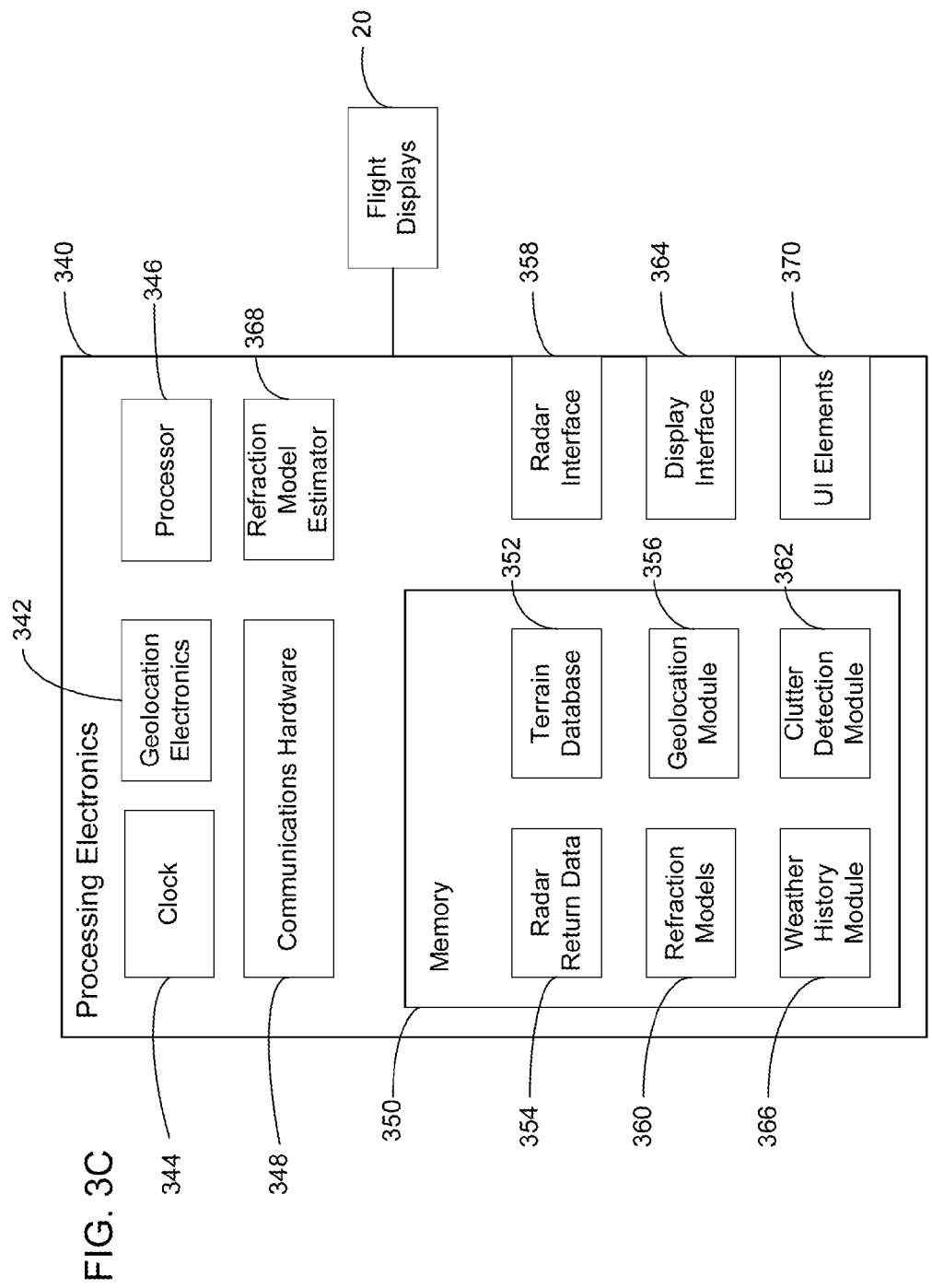

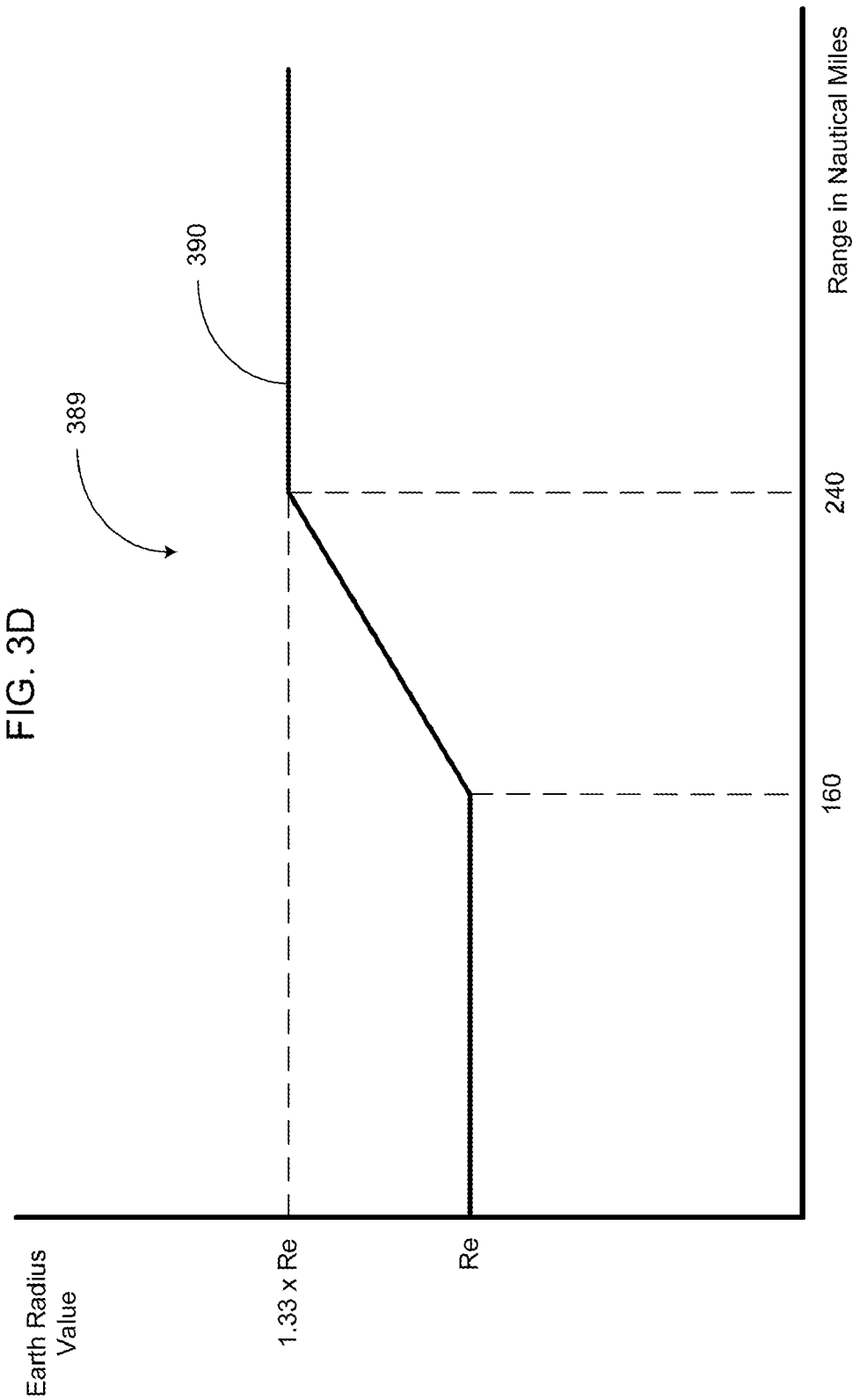

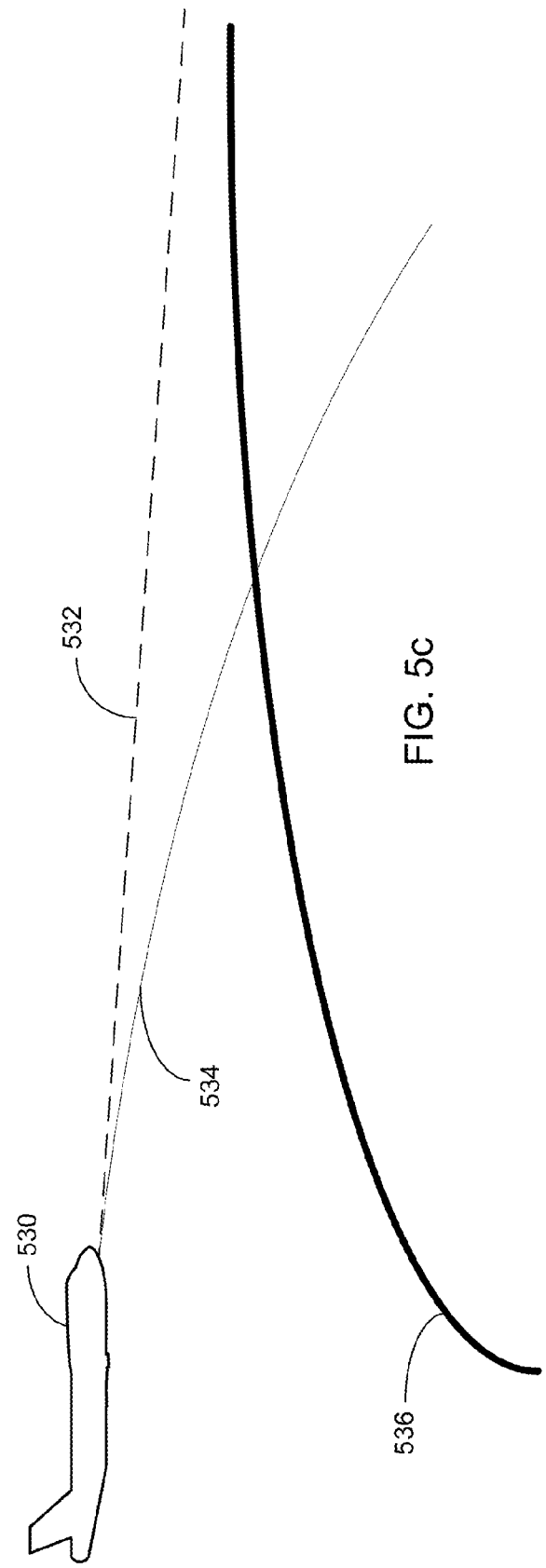

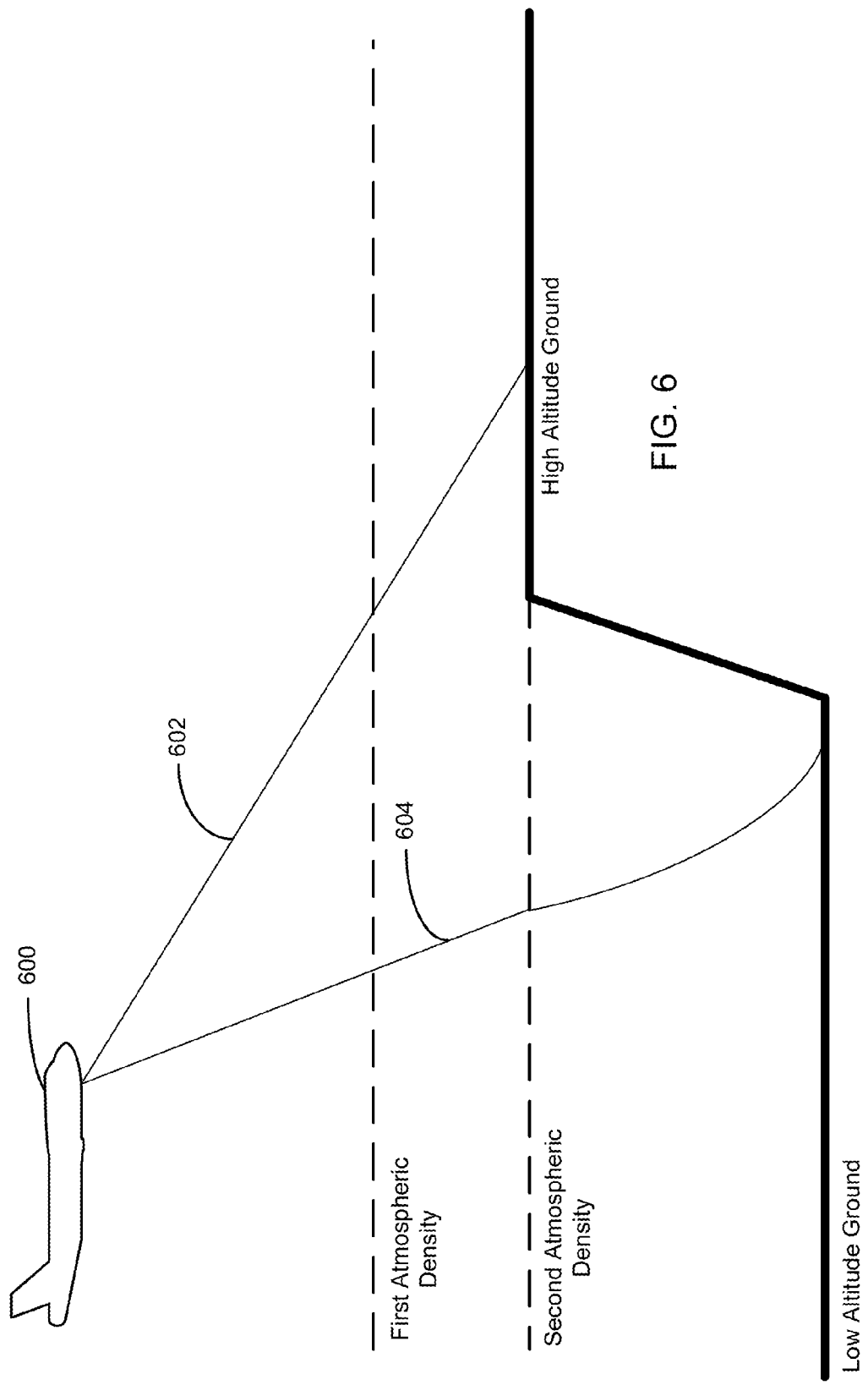

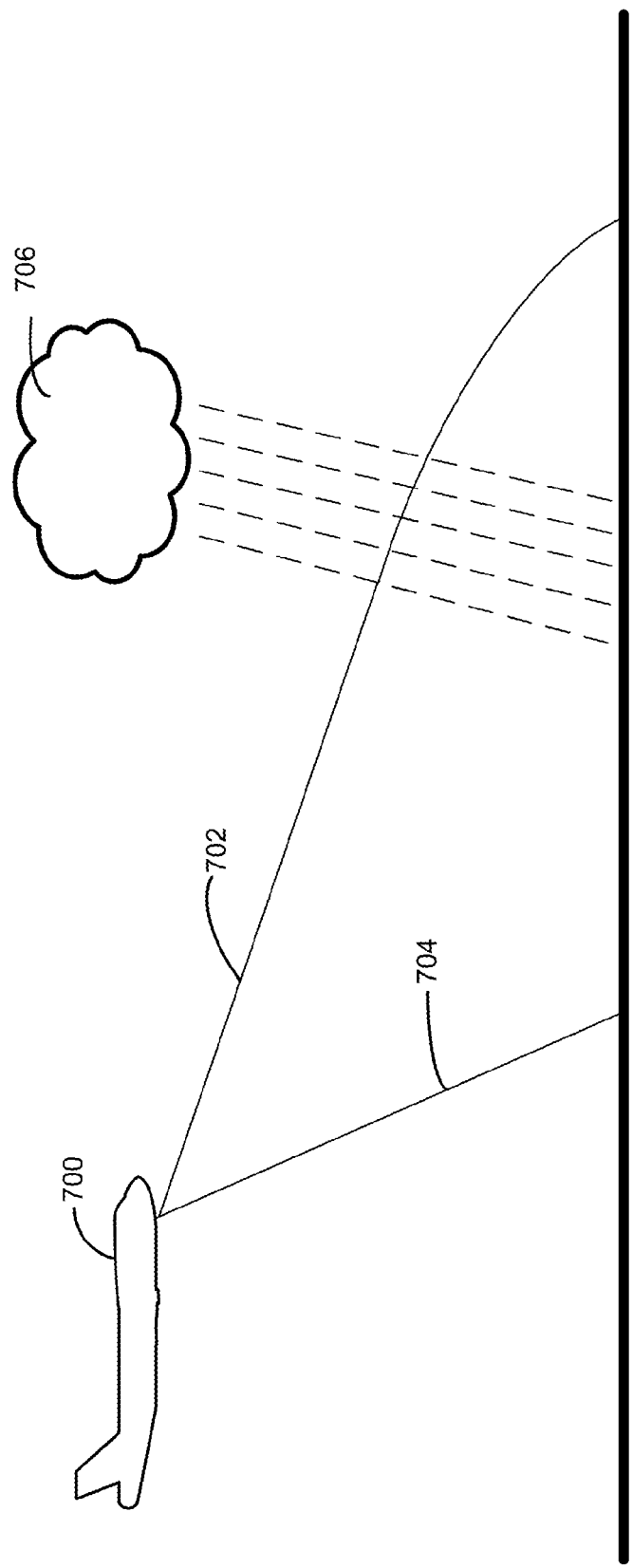

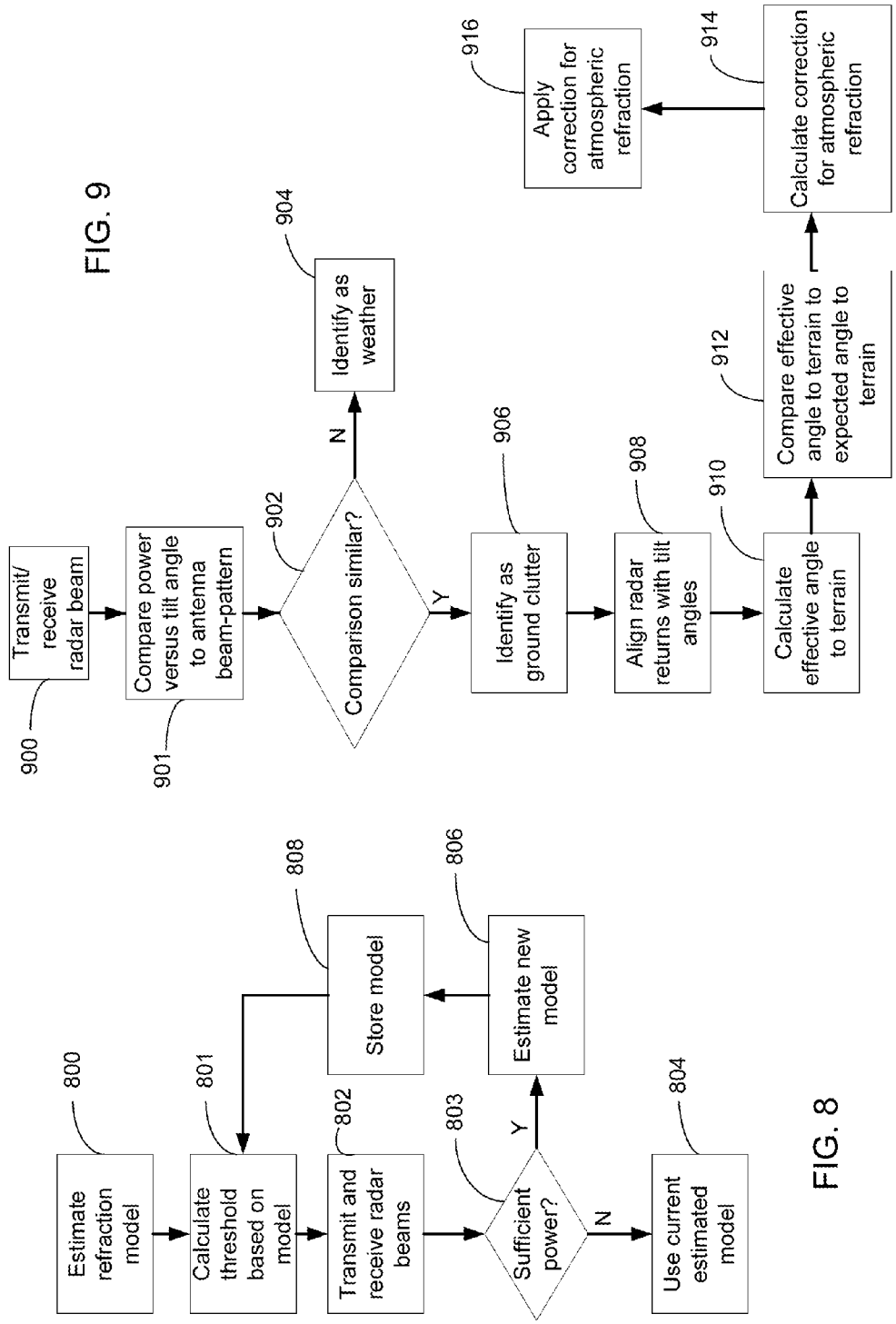

SYSTEM AND METHOD FOR USING A RADAR TO ESTIMATE AND COMPENSATE FOR ATMOSPHERIC REFRACTION

BACKGROUND

The present disclosure relates generally to the field of an aircraft weather radar system for assessing weather and ground clutter. The disclosure more specifically relates to an aircraft weather radar system capable of compensating for atmospheric refraction.

Aircraft weather radar systems are used to assess weather altitudes and to separate weather from ground clutter. In conventional aircraft weather radar systems, changes in atmospheric refraction produce radar beam bending, which in turn causes variations in weather and ground height estimations. These variations cause errors in the assessment of weather altitudes as well as in the weather and/or clutter separation process.

Currently, the MultiScan® radar system manufactured by Rockwell Collins, Inc. uses a dual beam system to generate change in power estimates from targets within its field of view. For a given target the change in power estimates between the two beams is determined by the target's angular position in the beam set. The farther a target is below the center of the radar beam set, the larger the difference in return power between the two beams. For ground targets, the targets' perceived angular position in the beam set is a function of the aircraft altitude, physical beam pointing angles, geometry to the curved Earth's surface, and bending of the radar's beam along the path to and from the Earth. This bending, caused by changes in atmospheric density, is known as refraction. For ground based radars there is an accepted approximation for estimating the bending of a radar's beam through the atmosphere due to "standard atmospheric conditions". This approximation assumes the atmosphere's density and water content is constant but the Earth's diameter is 4/3 times the Earth's actual diameter. While generally useful, this approximation is not effective in all conditions and locations.

In extreme cases, a high vertical gradient in moisture content may cause a radar beam pointed above the horizon to bend downwards and hit the ground at some long range. This produces spurious ground returns from anomalous propagation or "ducting".

Various and somewhat unpredictable atmospheric conditions can make compensation for beam bending difficult. For example, the atmosphere's moisture gradient can contribute to the amount of beam bending (e.g., moisture from rain may result in increased radar beam refraction).

Therefore, there is a need for an aircraft weather radar system that can more accurately predict weather at medium to long ranges. There is also a need for weather and ground return processing that more accurately separates weather from ground clutter. There is a further need for a weather system that may detect the altitude of weather and ground clutter with increased accuracy. Further still, there is a need for a system and method of compensating for the affects of refraction on the radar beam. Yet further, there is a need for a system and method that compensates for "beam bending" or ducting.

SUMMARY

One embodiment of the disclosure relates to an aircraft weather radar system that may include an antenna for casting radar beams. The aircraft weather radar system includes an input for receiving data associated with weather radar returns received by the antenna. The aircraft weather radar system further includes a processor for performing a routine to analyze radar returns associated with terrain. The processor is configured to determine atmospheric refraction characteristics based on a range and/or an angle to terrain. The routine is based on the determination of atmospheric refraction characteristics.

Another embodiment of the disclosure relates to a method of adapting weather radar processes or thresholds. The method includes receiving specific location information (e.g. latitude and longitude coordinates, aircraft heading, etc.) and/or general location information (e.g. mountainous or desert region) and/or an indication of time and date. The method also includes a process for automatically adjusting a calculation associated with radar returns to compensate for atmospheric refraction effects based upon the indication of the time of day or the specific location information or the general location information.

A further embodiment of the disclosure relates to an avionics system. The system includes means for receiving data associated with weather radar returns received by the antenna. The system further includes means for performing a routine to determine weather radar returns associated with terrain. The system yet further includes means for providing atmospheric refraction characteristics based on a range and/or angle to terrain.

BRIEF DESCRIPTION OF THE DRAWINGS

The disclosure will become more fully understood from the following detailed description, taken in conjunction with the accompanying drawings.

FIG. 3C is a block diagram of a radar system, according to an exemplary embodiment.

FIG. 3D is a graph of a simplified earth radius model, according to an exemplary embodiment.

FIG. 5C is an illustration of radar beam bending with a high moisture or density gradient in the atmosphere, according to an exemplary embodiment.

FIG. 6 is an illustration of the effects of altitude on an aircraft weather radar system, according to an exemplary embodiment.

FIG. 7 is an illustration of the effects of weather on an aircraft weather radar system, according to an exemplary embodiment.

FIG. 8 is a process flow diagram that illustrates a process for estimating index of refraction in low radar return environments, according to an exemplary embodiment.

FIG. 9 is a process flow diagram illustrating a further process for modeling atmospheric refraction effects and assessing ground clutter, according to an exemplary embodiment.

DETAILED DESCRIPTION OF THE EXEMPLARY EMBODIMENTS

Figure 1:
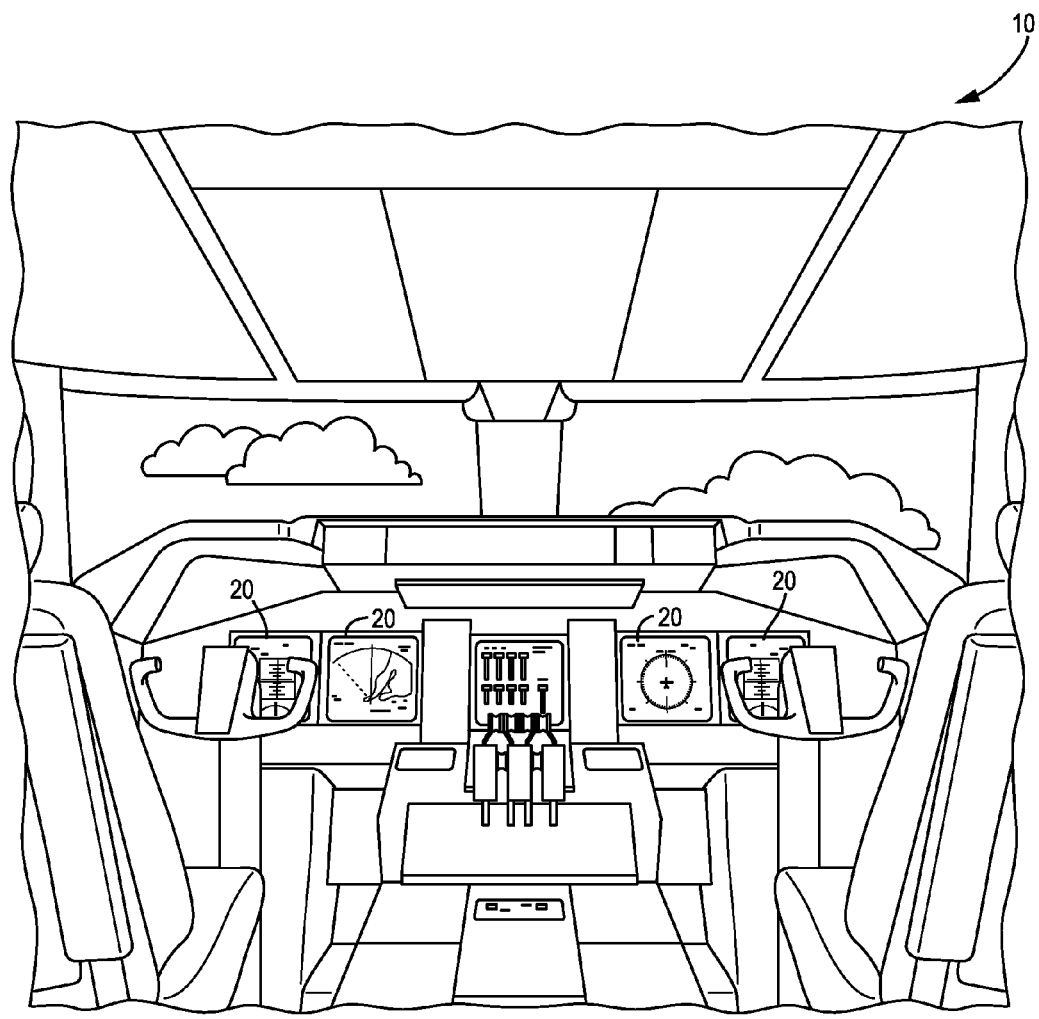
FIG. 1 is an illustration of an aircraft control center or cockpit, according to an exemplary embodiment.

Before describing in detail the particular improved system and method, it should be observed that the invention includes, but is not limited to a novel structural combination of conventional data/signal processing components and communications circuits, and not only in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring generally to the figures, a system and method to correct errors in radar return data due to environmental characteristics is shown. The system can include various flight displays, processing electronics, data modules, and a radar system. The method can include applying a correction to radar return data and/or radar return data processing based on measured changes in environmental characteristics. For example, the method can apply a correction to radar return data based on changes in terrain altitude, the current season, current weather conditions, the current geographical region, etc.

Referring to FIG. 1, an illustration of an aircraft control center or cockpit 10 is shown, according to one exemplary embodiment. Aircraft control center 10 includes flight displays 20 which are used to increase situational awareness and to enhance decision-making abilities.

Flight displays 20 provide an output from a radar system of the aircraft. Flight displays 20 can include a weather display, a multi-function display, a weather radar map and/or a terrain display. Further, flight displays 20 can include an electronic display or a synthetic vision system (SVS). For example, flight displays 20 can include a display configured to display a three dimensional perspective image of terrain and/or weather information. Other views of terrain and/or weather information may also be provided (e.g. plan view, horizontal view, vertical view, etc.). Additionally, flight displays 20 can be implemented using any of a variety of display technologies, including CRT, LCD, organic LED, dot matrix display, and others. Flight displays 20 can also include head-up displays (HUD) with or without a projector.

Figure 2:
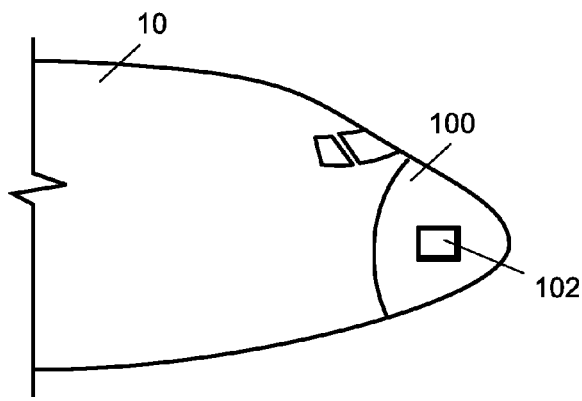
FIG. 2 shows the front of an aircraft with an aircraft control center and nose, according to an exemplary embodiment.

In FIG. 2 an illustration of the front of an aircraft is shown with aircraft control center 10 and nose 100, according to an exemplary embodiment. A radar system 102 is shown located inside nose 100 of the aircraft. According to other exemplary embodiments, radar system 102 may be located on the top of the aircraft or on the tail of the aircraft. Yet further, radar system 102 can be located anywhere on the aircraft. Furthermore, the various components of radar system 102 can be distributed at multiple locations throughout the aircraft. Additionally, radar system 102 may include or be coupled to an antenna system.

Figure 3A:
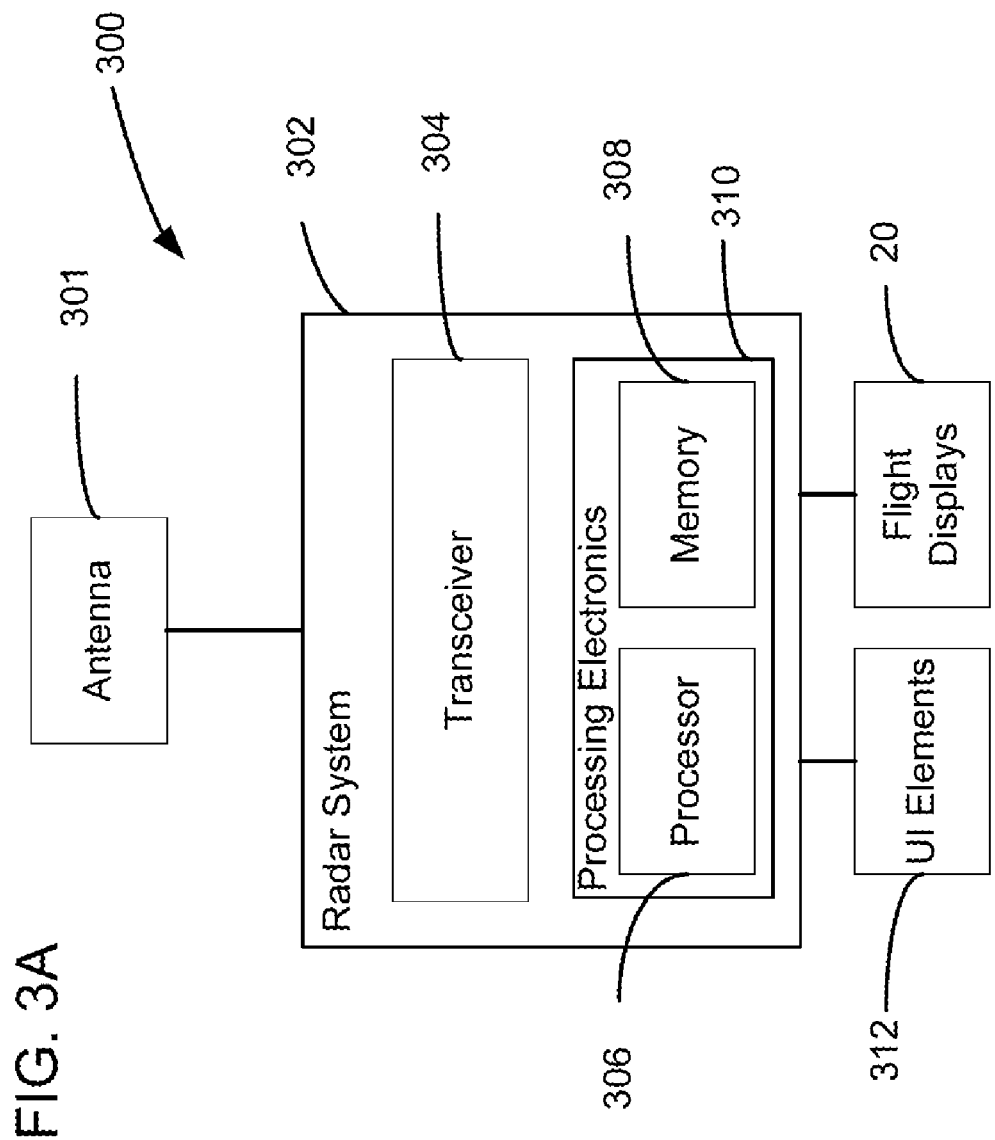
FIG. 3A is a block diagram of a weather radar system, according to an exemplary embodiment.

In FIG. 3A, a weather radar system 300 is shown, according to an exemplary embodiment. The weather radar system includes an antenna 301, radar system 302, user interface (UI) elements 312, and flight displays 20. Radar system 302 is coupled to an antenna 301. Antenna 301 may receive radar returns from a target. Radar system 302 is additionally coupled to UI elements 312 and flight displays 20.

Referring to FIG. 3A, radar system 302 is shown to include a transceiver 304 and processor 306. Transceiver 304 includes a receive circuit configured to receive data from the antenna 301 and to provide the data to processor 306. Transceiver 304 also transmits signals via the antenna 301. For example, transceiver 304 can be used to transmit and receive a radar sweep.

Radar system 302 is additionally shown to include processing electronics 310. Processing electronics 310 is shown to include processor 306 and memory 308. Processing electronics 310 is generally configured to facilitate and/or conduct the activities described herein. For example, processing electronics 310 can calculate locations of weather and ground clutter based on radar returns received via antenna 301.

Processor 306 may store information in memory 308 to be retrieved for later use. According to various exemplary embodiments, processor 306 can be any hardware and/or software processor or processing architecture capable of executing instructions and operating on data related to the radar returns. Further, memory 308 can be any volatile or non volatile memory device. Furthermore, memory 308 can be any internal or external device or devices. For example, memory 308 can be local to processing electronics 310 (as shown) or can be distributed in whole or in part from processing electronics 310.

Radar system 302 is shown to be connected to flight displays 20. Radar system 302 can be configured to output data to flight displays 20. For example, radar system 302 and processing electronics 310 in particular can generate and output weather images to flight displays 20.

Radar system 302 can also be configured to receive user inputs from UI elements 312. UI elements 312 can include dials, switches, buttons, touch screens, or any other user input device. UI elements 312 can be used to adjust features of flight displays 20, such as contrast, brightness, width, and length. UI elements 312 can also (or alternatively) be used by an occupant to interface with or change the displays of flight displays 20. UI elements 312 can additionally be used to adjust information shown on flight displays 20.

Figure 3B:
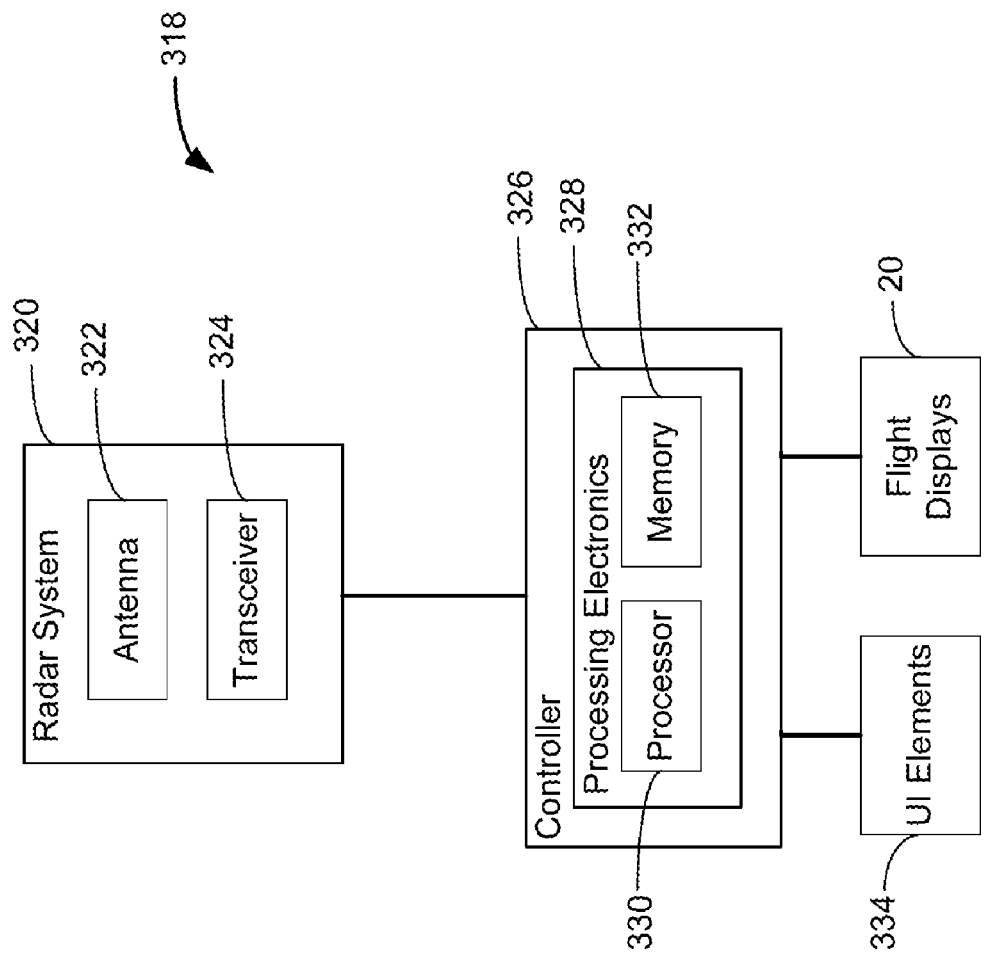
FIG. 3B is a block diagram of a weather radar system, according to a further exemplary embodiment.

Referring to FIG. 3B, system 318 (e.g. weather radar system, avionics system, etc.) is shown, according to a further exemplary embodiment. System 318 is shown to include radar system 320, controller 326, UI elements 334, and flight displays 20.

Radar system 320 can be any system configured to transmit and receive data related to radar returns. Radar system 320 includes an antenna 322 and transceiver 324. Transceiver 324 can be used to transmit and receive signals via the antenna 322. Antenna 322 can be used to transmit radar beams and to receive radar returns from a target. It should be noted that the term "beam" as used in the present application, may refer to a radar transmitting and receiving a pulse or a series of pulses at a specific tilt and/or azimuth angle.

Further, radar system 320 is configured to communicate radar returns to controller 326. Controller 326 includes processing electronics 328. Controller 326 can generate and output data related to radar returns to flight displays 20. For example, controller 326 can output terrain images and/or weather images to flight displays 20 based on returns received from the radar system 320. Additionally, controller 326 can receive user inputs via UI elements 334. For example, controller 326 can receive an input from UI elements 334 to increase the brightness of images shown on flight displays 20.

Processing electronics 328 can be configured to execute instructions and operate on data related to radar returns as received from radar system 320. Data can additionally include data received from UI elements 334. Processing electronics 328 includes processor 330 and memory 332. Processor 330 can be any hardware and/or software configuration capable of executing instructions and operating on data related to radar returns. Processor 330 can also store radar system return data in memory 332. Further, memory 332 can be any volatile or non volatile memory. Memory 332 can also be any internal or external memory device or devices.

Referring to FIG. 3C, processing electronics 340 are shown in detail, according to an exemplary embodiment. Processing electronics 340 can be the same or different than the processing electronics of FIGS. 3A and 3B (e.g., processing electronics 340 can be the processing electronics 320 of FIG. 3A and/or the processing electronics 328 of FIG. 3B).

Processing electronics 340 is shown to include clock 344, geolocation electronics 342, processor 346, communications hardware 348, refraction model estimator 368, and memory 350.

Clock 344 is a device configured to determine time and to keep time. Time determined by clock 344 can include the hour, date, month, year, season, etc. Time determined by clock 344 can be associated with radar returns and/or calculations performed by processing electronics 340. For example, clock 344 can determine a time at which a radar return was received.

Geolocation electronics 342 can be a global positioning system (GPS), a gyroscope, a compass, and/or any other navigational system for determining geographic location of the aircraft. For example, geolocation electronics 342 can determine the past, present, or future location of the aircraft based on coordinates received by a global positioning system.

Geolocation electronics 342 can also determine the current geographical region. The current geographical region can be determined based upon a terrain database and/or a current location. For example, using the determined longitude and latitude (e.g. geographical location), geolocation electronics can determine that the current location lies within an area designated as a desert within the terrain database. Thus, the geolocation electronics can determine that the current geographical region is a desert. Geolocation electronics might additionally determine that the current location is a plain, forest, ocean, etc.

Processor 346 can be any hardware and/or software architecture. Processor 346 can be capable of operating on data related to radar returns. For example, processor 346 can determine whether or not a radar return is ground clutter. Processor 346 is also capable of responding to data received from user inputs. For example, processor 346 can adjust the width of an item displayed on flight displays 20 in response to a user input. Processor 346 can also be configured to access, read, and execute computer code or other instructions (e.g., residing in memory 350). The computer code can be computer code configured to execute or describe the activities described in the present application.

Communications hardware 348 can be any hardware used for communication between processing electronics 340 and other external components. For example, communications hardware 348 can be an Ethernet port, USB port, coaxial cable, etc. for communicating data from an antenna to processing electronics 340. Further, communications hardware 348 can be used to communicate data from components other than an antenna. For example, communications hardware 348 can be used to communicate data from flight displays 20, radar interface 358, display interface 364, UI elements 370, or any other source of data. Communications hardware 348 can also (or alternatively) be communications hardware for communicating data to and/or from remote systems (e.g., another airplane, a ground-based server, etc.)

Refraction model estimator 368 is configured to estimate an atmospheric refraction model. Refraction model estimator 368 can select or adjust an atmospheric refraction model based on data received from various sources, including but not limited to clock 344, geolocation electronics 342, communications hardware 348, memory 350, radar return data 354, weather history module 366, terrain database 352, radar interface 358, etc. The atmospheric refraction model can be an earth radius model. The value of the earth radius model can be varied depending on the data received by refraction model estimator 368. For example, as refraction model estimator 368 measures increased or decreased refraction effects, the value of the earth radius model can be increased or decreased accordingly.

Memory 350 is shown to include terrain database 352, radar return data 354, geolocation module 356, refraction models 360, clutter detection module 362, and weather history module 366. Memory 350 can be any volatile or non volatile memory device or devices. Memory 350 can be memory local to processing electronics 340 or can be a part of one or more different systems, computers, or storage mechanisms.

Terrain database 352 stores terrain data for use by terrain display electronics, geolocation module 356, clutter detection module 362, refraction models 360, refraction model estimator 368, processor 346 or other circuits or processing modules of the aircraft. For example, terrain database 352 can contain information regarding geographical features in the vicinity of the aircraft.

Radar return data 354 stores information from radar returns. Radar return data 354 can be used by one or more circuits or processing modules for display purposes or for the calculation of other information such as atmospheric refraction, location, geographical region, and the like. For example, radar return data 354 can store data from a radar sweep for later access by a processing module, processing circuit, etc.

Geolocation module 356 calculates and/or stores information relating to location of the airplane. Geolocation module 356 can calculate and/or store information with reference to a time given by clock 344. Geolocation module 356 can calculate and/or store information relating to location as gathered by a radar sweep, GPS, navigational equipment, etc. For example, geolocation module 356 can store information relating to coordinates received by a GPS device in addition to at what time the coordinates were received as determined by clock 344.

Refraction models 360 includes various models of atmospheric refraction. An appropriate atmospheric refraction model can be selected by refraction model estimator 368. In an alternative embodiment, refraction model estimator 368 can generate a compensated earth radius as a method for modeling the affects of a given environment's atmospheric refraction. For example, refraction model estimator 368 can estimate a correction for the atmospheric refraction that uses a compensated earth radius in the geometry equations. This compensated earth radius would vary with range to account for more refractive affects the longer the radar beam is engaged with (or traveling through) the atmosphere.

Clutter detection module 362 calculates and/or stores information related to areas of detected ground clutter. Information calculated and stored by clutter detection module 362 can be accessed at any time by other processing electronics and/or modules of the aircraft. For example, clutter detection module 362 can calculate and store areas of detected ground clutter based on radar returns for later access by processor 346.

Weather history module 366 calculates and/or stores historical information related to weather returns. Information stored in weather history module 366 can be accessed at any time by other processing electronics and/or modules of the aircraft. For example, weather history module 366 can store information related to previously sampled weather returns for later access by processor 346.

Radar interface 358 can include buttons, switches, levers, touch screens or other UI elements with which a user can interact. Radar interface 358 is configured to change various aspects of the radar system. For example, radar interface 358 may be used to change the range of displayed radar return information or the specific data that is being displayed (e.g. turbulence, weather, map, etc.).

Display interface 364 can include buttons, switches, levers, touch screens or other UI elements with which a user can interact. Display interface 364 is configured to change various aspects of the display systems. For example, display interface 364 can be used to adjust the height, width, brightness, contrast, etc. of the images on flight displays 20.

UI elements 370 can include dials, switches, buttons, touch screens, or any other user input device. UI elements 370 is configured to adjust various flight systems. For example, UI elements 370 can be used to adjust contrast, brightness, width, and length of flight displays 20. UI elements 370 can also (or alternatively) be used by an occupant to interface with or change the content of flight displays 20 or to change the radar operating modes or to select displayable products. UI elements 370 can additionally be used to adjust information shown on flight displays 20.

Referring to FIG. 3D, a graph of a simplified earth radius model 389 is shown, according to an exemplary embodiment. Refraction model 389 can be stored in refraction models 360 and/or generated by refraction model estimator 368. Assumed earth radius 390 is shown varying with range, thereby accounting for more refractive affects the longer a radar beam is traveling through the atmosphere. At a range of 160 nautical miles or less, assumed earth radius 390 is held constant at a value of Re. Between ranges of 160 nautical miles to 240 nautical miles, the assumed earth radius 390 varies linearly. At ranges beyond 240 nautical miles, the assumed radius 390 is held constant at a value of 1.333×Re. Additionally, it should be noted that the value of assumed earth radius 390 can vary nonlinearly. A more detailed model may contain a continuously variable earth radius as a function of range and/or azimuth angle for the entire radar return range. Further, the value of assumed radius 390 can be dependent on variables other than range. For example, assumed earth radius 390 can additionally (or alternatively) be dependent on azimuth angle.

Figure 4:
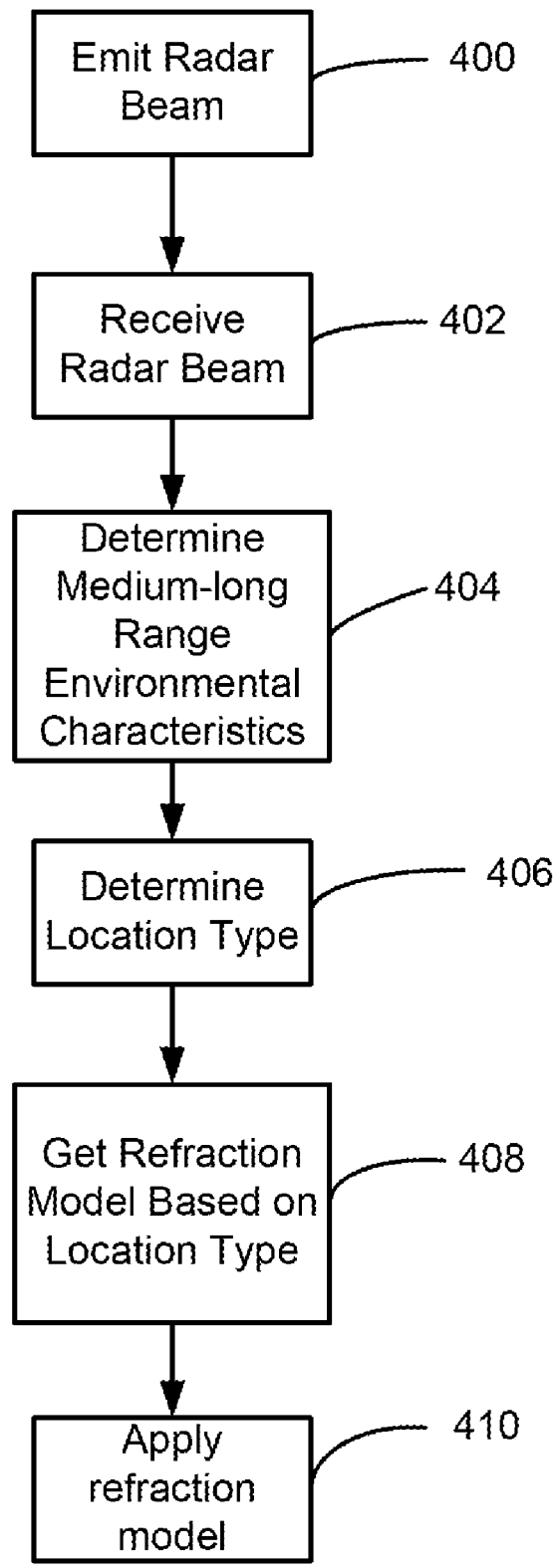
FIG. 4 is a flow diagram of a method for compensating for an index of refraction, according to an exemplary embodiment.

Referring to FIG. 4, a flow diagram of a method for compensating for atmospheric refraction is shown, according to an exemplary embodiment. The method can determine an appropriate atmospheric refraction model. The atmospheric refraction model can be determined based on data related to radar returns, geography, and time of year (e.g., season). For example, Mediterranean climates have a consistently higher moisture gradient, resulting in higher beam bending. Therefore, when the location of the aircraft is determined to be in a Mediterranean location, a model with stronger effects of atmospheric refraction can be selected for application by the system. Furthermore, locations such as Atlanta typically have a high moisture gradient during the summer and a low moisture gradient in the winter. Thus, an atmospheric refraction model with strong effects can be applied by the system during the summer, and an atmospheric refraction model with weak effects may be applied by the system during the winter.

As shown in FIG. 4, the method begins after a radar beam is emitted in step 400, and received in step 402. The processing electronics then determine the current environmental characteristics 404 based on known data. The environmental characteristics determined in step 404 can include location, altitude, weather, and time of year. After the environmental characteristics are determined, the processing electronics determine the location type. The location type can include desert environments, aquatic environments, plain environments, etc. The processing electronics then retrieve the appropriate refraction model from memory 350 based upon the location type (step 408). The processing electronics then apply the refraction model (step 410) determined in step 408. For example, the processing electronics may determine that a refraction model with strong effects is appropriate. As a result, the processing electronics can apply the given refraction model to radar returns, thereby compensating for high beam bending. Further, the process may be run continuously, applying the appropriate corrections to data as it is received.

Figure 5A:
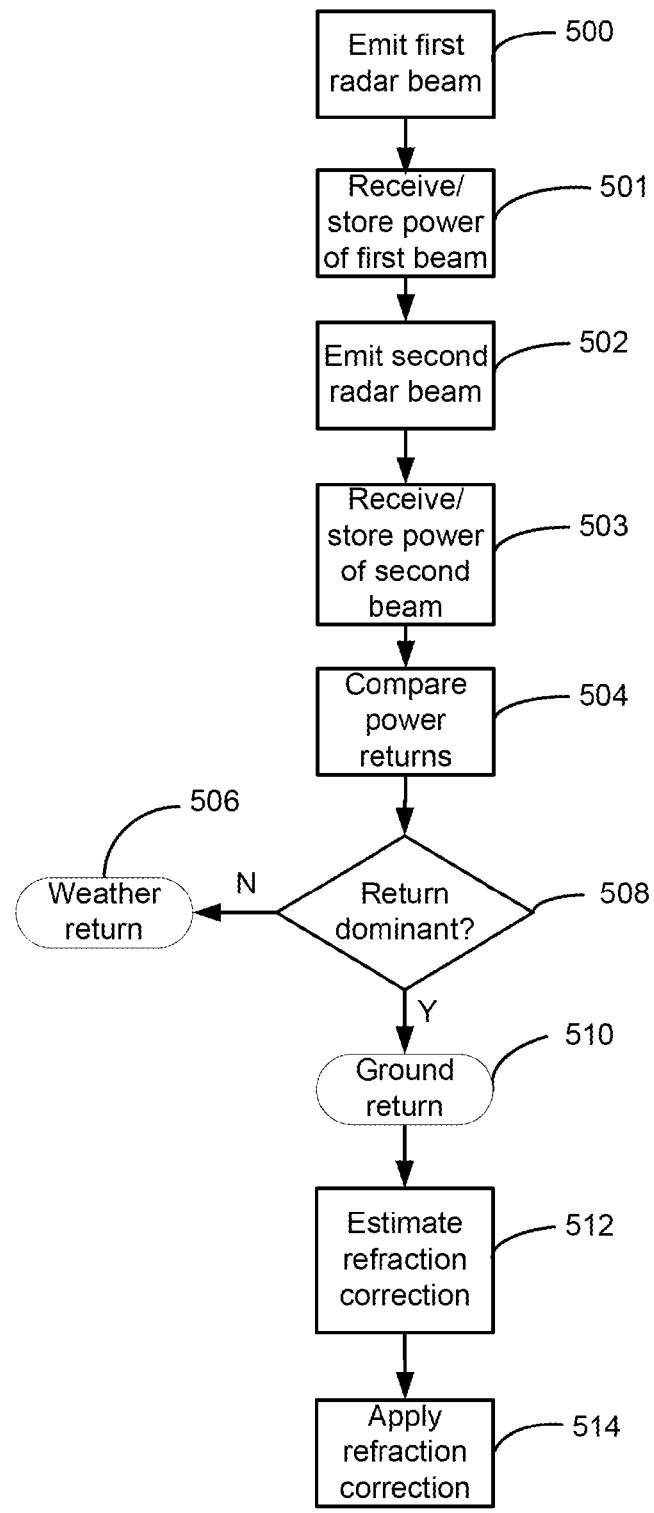
FIG. 5A is a flow diagram for a ground and clutter and weather separation method, according to an exemplary embodiment.

Referring to FIG. 5A, a flow diagram for a ground clutter and weather separation method is shown, according to an exemplary embodiment. A first radar beam is emitted (step 500). When the first radar beam is received, the return power of the beam is stored (step 501). Similarly, a second radar beam is emitted (step 502). When the second radar beam is received, the return power of the second beam is stored (step 503). When power returns from both the first and second radar beams are received, the difference in power returns is calculated by the processing electronics (step 504). Thus, a power difference between the return powers of the first radar beam and second radar beam is obtained. In step 508, the difference in return power calculated in step 504 is compared to the differences of other return values.

Strong weather seldom occupies a majority of the radar display. Therefore, if the difference in return power calculated in step 504 is not consistent with a majority of return data, then the return is classified as weather (step 506) by the processing electronics. When the return power calculated in step 504 is consistent with a majority of returns, the return is classified as a ground return (step 510) by the processing electronics. When a ground return is detected, the radar return is used by the processing electronics to estimate a refraction correction (step 512). Following estimation of a refraction correction in step 512, the refraction correction is applied (step 514) by the processing electronics.

The refraction correction can be applied numerous ways. For example, the refraction correction can be applied to an earth radius model. In a further example, the refraction correction is applied directly to a ground clutter decisions process through altering a ground clutter/weather separation threshold.

According to various exemplary embodiments, the ground clutter/weather separation threshold is an expected difference in power between two or more radar beams for distinguishing ground clutter from weather. The ground clutter/weather threshold may be calculated based on aircraft altitude, terrain height, radar antenna tilt, assumed earth radius and other inputs. According to some exemplary embodiments, the threshold is computed using assumed atmospheric conditions. By comparing the expected change in power between the two (or more) beams to the actual change in power between the two (or more) beams (sampled by the radar), radar returns can be classified as either ground or weather. For example, if the difference in return power between the two beams is greater than the ground clutter/weather separation threshold, then the return is classified as a ground return. Conversely, if the difference in return power between the two beams is less than the ground clutter/weather separation threshold, then the return is classified as a weather return. Atmospheric refraction can affect the actual power difference received by the two beams, causing the return to be wrongly classified.

Figure 5B:
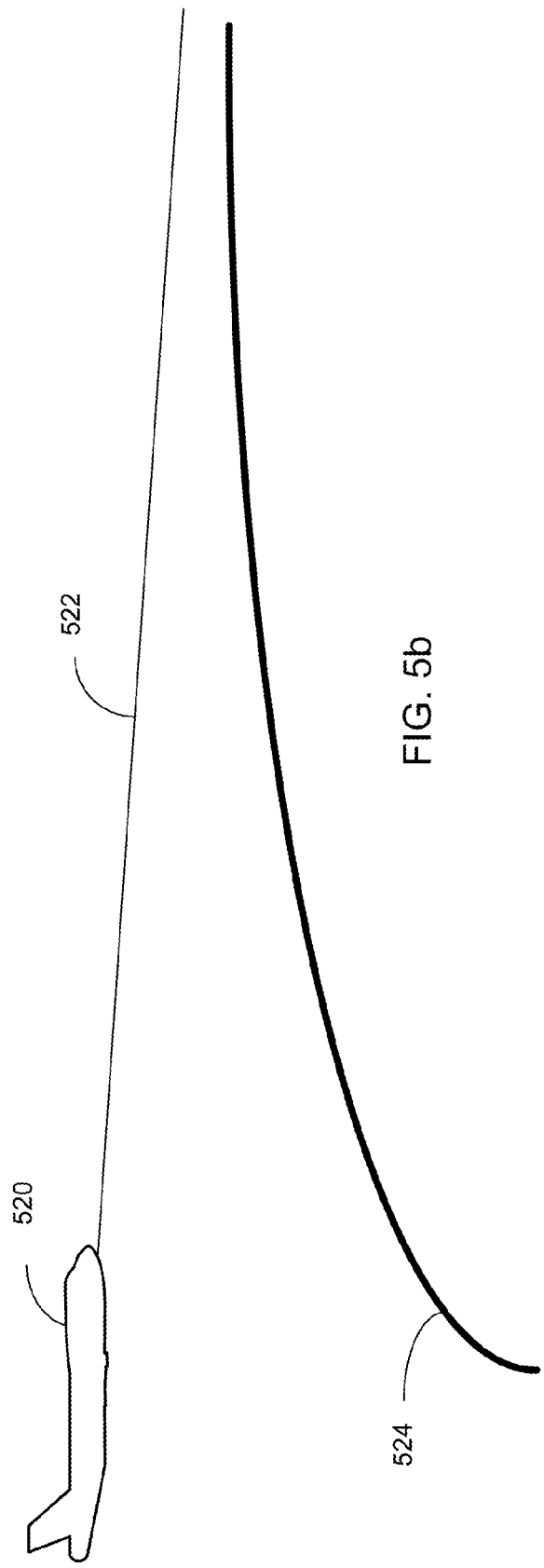
FIG. 5B is an illustration of radar beam bending with a low moisture or density gradient in the atmosphere, according to an exemplary embodiment.

Referring to FIG. 5B, an illustration of radar beam bending in an atmosphere with a low moisture or density gradient is shown, according to an exemplary embodiment. Aircraft 520 is shown with an emitted radar beam path 522. Emitted radar beam path 522 is shown with minimal refraction and extending over earth 524. In this case, no atmospheric refraction correction is necessary. Additionally, an assumed radius of the earth is used to compute the threshold. Due to minimal refraction, the estimated difference in power between the two beams of a radar sweep match closely with the actual difference in power as sampled by the radar. Since the assumed conditions match the actual conditions, the pre-computed threshold is appropriate and leads to an accurate ground clutter/weather decision. As a result, no change to the ground clutter/weather separation thresholds is required.

Referring to FIG. 5C, an illustration of radar beam bending in an atmosphere with a high moisture or density gradient is shown, according to an exemplary embodiment. Aircraft 530 is shown with an expected radar beam path 532 and actual radar beam path 534. Actual radar beam path 534 is shown bending significantly due to a high moisture or density gradient. As a result, radar beam path 534 makes contact with earth 536. In this case, the refraction has changed the beam's relative position to the ground clutter (either closer to or further from). As a result, the assumed difference in power between the two beams of a radar sweep will not match the difference in power computed from actual radar received returns. This mismatch leads to an inappropriate threshold and, therefore, an inaccurate ground clutter/weather decision.

Figure 5D:
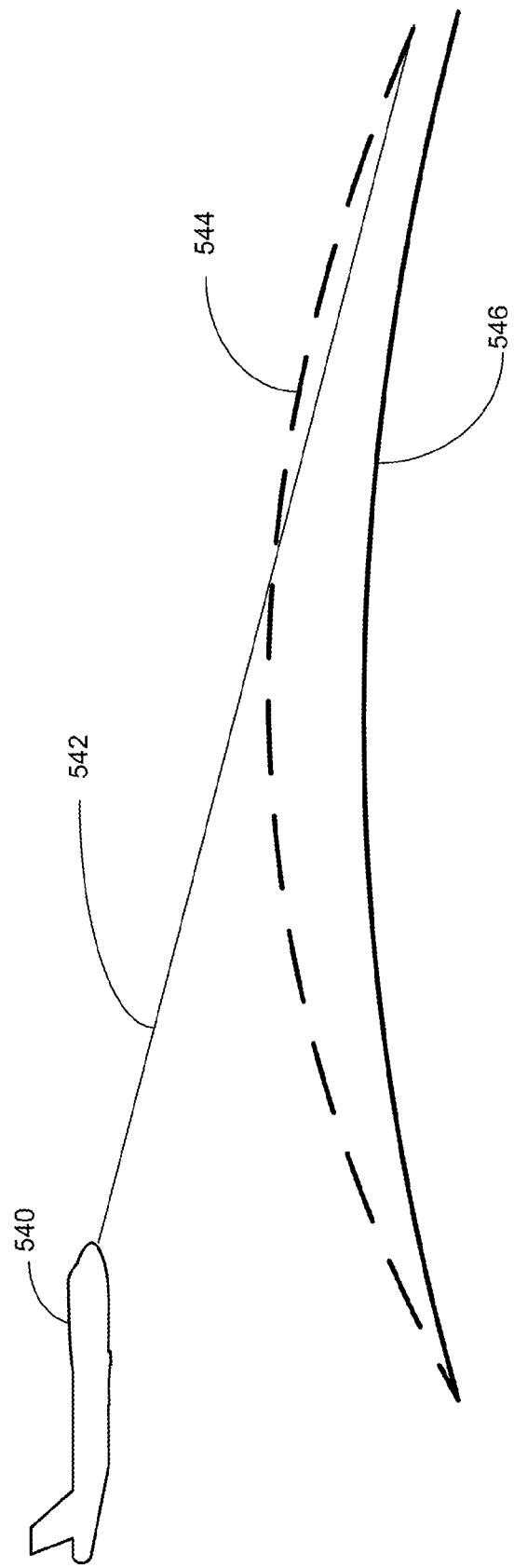
FIG. 5D is an illustration of a methodology for compensating for radar beam bending due to refraction, according to an exemplary embodiment.

Referring to FIG. 5D, an illustration of a methodology for compensating for radar beam bending due to refraction is shown, according to an exemplary embodiment. Aircraft 540 is shown with radar beam path 542. Radar beam path 542 is shown extending through adjusted earth radius 544 and actual earth radius 546. Further, radar beam path 542 is assumed to be travelling through the atmosphere without bending (in a straight line). Furthermore, the earth is assumed to have an adjusted earth radius 544 and an actual earth radius 546. When the radius of the earth in the geometry calculations is changed, the refractive effects of the earth's atmosphere on radar beam path 542 can be estimated. Additionally, the adjusted earth radius 544 can be applied to the ground clutter/weather separation threshold computation. Alternatively, the adjusted earth radius 544 can be applied to any process which utilizes angle from aircraft 540 to the earth through the earth's atmosphere to assess weather or terrain characteristics.

Figure 5E:
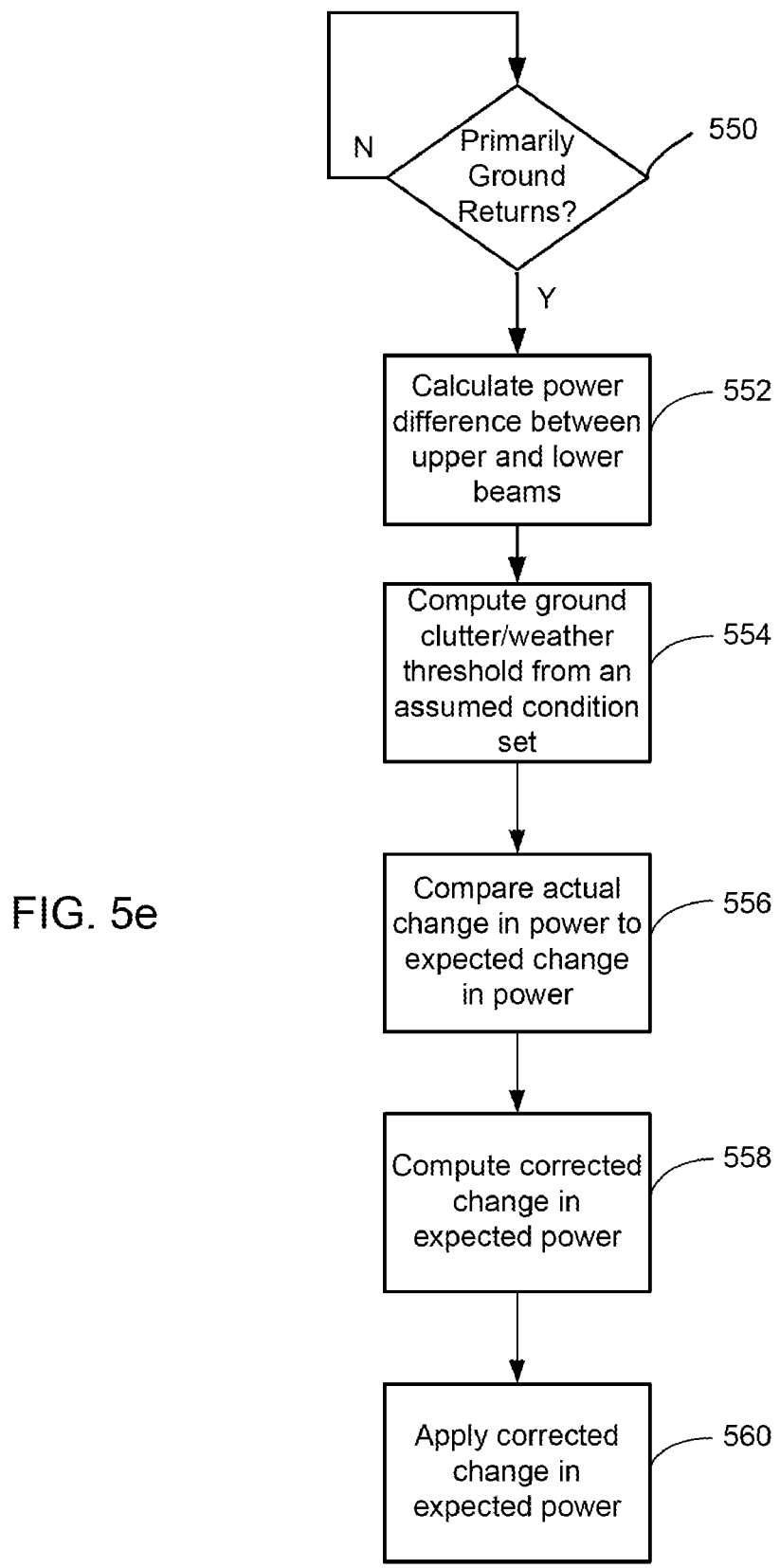
FIG. 5E is a flow diagram of a method for applying a correction for atmospheric refraction, according to an alternative exemplary embodiment.

Referring to FIG. 5E, a method for applying a correction for atmospheric refraction is shown, according to an alternative exemplary embodiment. The method shown in FIG. 5E can be configured to directly compute a change in the threshold without computing or assuming a change in the earth's radius. Additionally, the method can be used in the embodiment of FIG. 5C, wherein the atmosphere has a high moisture or density gradient. As a result, the assumed difference in power between the two beams does not match the actual difference in power.

Initially, the processing electronics conduct a preliminary determination to determine if available radar returns are primarily ground clutter returns (step 550). If the radar returns are primarily from ground, then the power difference between the upper and lower beams is calculated (step 552). Subsequently, a ground clutter/weather threshold is computed based on assumed conditions (step 554). In step 556, the actual change in power from step 552 is compared to the expected change in power from step 554. Step 558 computes a corrected change in expected power based on the comparison from step 556. The corrected change in expected power from step 558 is then used as the new ground clutter/weather threshold and applied to ground and weather returns (step 560). Furthermore, additional processing or filtering methods can be used to ensure that only ground returns are being assessed for estimating refractive effects.

An adjusted earth radius model or difference between actual and expected power differences between the two (or more) beams can also be combined with geographic region and time and date to select pre-stored earth radius models or other atmospheric refraction models.

When the refraction correction is applied, the processing electronics can more accurately separate ground returns from weather returns, water returns, etc. More particularly, the aforementioned method may be used to filter out spurious ground returns in addition to weather returns. For example, in extreme cases, weather may cause radar beams to bend downward towards the ground, producing false ground returns. The method may detect the aforementioned false ground returns based on detected fluctuations in return power. Once detected, the method can appropriately detect and classify the false ground return as weather. Thus, false ground returns due to beam bending can be appropriately classified as weather returns.

Furthermore, it should be appreciated that the aforementioned method is not limited to the specific configurations thereof. For example, the above method is not limited to a radar system using two radar beams. The method can also be used in conjunction with radar systems using one beam, four beams, five beams, etc.

Referring to FIG. 6, an illustration of the effects of altitude on an aircraft weather radar system is shown, according to an exemplary embodiment. The aircraft 600 may emit a plurality of radar beams. Shown in FIG. 6, a radar path is directed towards a high terrain altitude 602. A second radar path is shown directed towards a low terrain altitude 604. As altitude changes, the density and humidity of the atmosphere in that region may fluctuate. As a result, the refraction effects may vary with changes in terrain altitude. A lower terrain altitude may have higher density and humidity than a higher terrain altitude, increasing the potential for refraction or beam bending. Therefore, the low terrain altitude path 604 is shown with a larger degree of beam bending. Conversely, the high terrain altitude path 602 is shown with a smaller degree of beam bending. In this embodiment, beam bending due to altitude may result in spurious ground returns and/or inaccurate weather and ground clutter separation.

In the aforementioned scenario, the method of FIG. 4 can be applied to compensate for low terrain altitude radar returns. Based on the radar returns, the processing electronics can determine that aircraft 600 is in a low terrain altitude region. As a result, the processing electronics can apply the appropriate model of refraction to compensate for beam bending due to the low terrain altitude. More particularly, the processing electronics can apply a refraction model for an environment with a larger degree of beam bending. Further, the method of FIG. 4 can be applied to compensate for high terrain altitude radar returns. If the processing electronics determine that aircraft 600 is in a high terrain altitude region, then a refraction model that compensates for a low degree of beam bending can be applied.

Referring to FIG. 7, an illustration of an aircraft weather radar system operating in different weather patterns is shown, according to an exemplary embodiment. An aircraft 700 emits multiple radar beams which travel along multiple paths, including radar paths 702, 704 at different tilt angles and therefore different distances to the ground. Radar path 702 points above the ground where it intersects a weather cell 706 or other region of high moisture content. As a result, radar beams along radar path 702 may bend downward towards the ground due to refraction from moisture. Thus, radar returns along radar path 702 may cause the aircraft weather radar system to produce a false ground return at a longer range. In contrast, a radar path 704 follows a lower tilt angle and therefore intersects the ground at a shorter range than radar path 702. If the radar beams along radar path 704 do not come into contact with a weather cell 706 or other region of high moisture, then radar returns along radar path 704 may experience significantly less bending than radar returns along radar path 702. In this case, radar returns along radar path 704 produce a more accurate and reliable reading than radar returns along radar path 702.

In the aforementioned embodiment, the method of FIG. 5 can be used. For example, the processing electronics can determine that the change in return power for radar beams along radar path 702 differs from the return power for radar beams along radar path 704. Further, returns with a change in power similar to radar returns along radar path 702 do not dominate the majority of the radar display. Therefore, the processing electronics can determine that radar returns along radar path 702 are weather related radar returns and/or spurious ground returns as a result of weather. As a result, an estimate of the refraction effects can be accurately computed, the ground clutter/weather thresholds can be corrected, and, finally, weather cell 706 can be accurately identified.

Referring to FIG. 8, a flow diagram of a method for estimating a refraction model and calculating a threshold based on the model is shown, according to an exemplary embodiment. The threshold is a pre-computed expected difference in return power between a first radar beam and a second radar beam. This pre-computed threshold is dependent on an assumed earth radius model. The pre-computed threshold may be modified by changing the assumed earth radius model to an earth radius model as sensed by the radar in real-time, thereby affecting the thresholds.

As shown in FIG. 8, when the method begins, a refraction model is used by the processing electronics based on initial conditions. These initial conditions could be a default setting for when no radar returns are qualified for estimating or could be based on other environmental conditions such as location, terrain height, time of year, time of day, etc. The processing electronics may use the initial refraction model to produce threshold estimates for weather and ground separation at all ranges in step 801. Additionally, threshold estimates may be adjusted for a newly generated value of the earth radius models where radar return data has sufficient power to estimate a new model. These computed earth radius models can be expanded and applied at ranges and angles without adequate radar return power to make a radius of the earth estimate. In step 802, a radar beam is transmitted and received. In step 803, the processing electronics checks to determine if the radar beam received in step 802 had sufficient power to make an estimate. If radar return power detected in step 803 is insufficient to make an estimate, the current estimated model may continue to be used (step 804). When a radar return with sufficient power is detected, the data from that return may be used by the processing electronics to update and/or estimate a new refraction model 806. The new model may be stored in step 808. The new model may also be used to calculate new refraction adjustments to the thresholds for all ranges in step 801. The process may then repeat, starting from step 802. Additionally, this process may be run in environments with limited radar returns, updating as additional qualified radar returns are received.

Referring to FIG. 9, a flow diagram of a method for modeling atmospheric refraction effects and assessing ground clutter is shown, according to an exemplary embodiment. A series of radar beams are transmitted and received (step 900) while sweeping the antenna along a vertical axis. After the radar returns are received, return power versus tilt angle is then compared to the antenna beam-pattern (step 901). The radar returns are compared for each range from the multiple tilt angles along the vertical sweep. Assuming that there is no weather significantly influencing the radar returns, the return power versus tilt angle at any range will look similar to the antennas beam-pattern centered on the effective tilt angle to the terrain. For ranges where there is weather influencing the radar returns, the power versus tilt angle will not look like the antenna's beam-pattern, but will be distorted. Therefore, by comparing the returns from multiple tilt angles at a given range, the returns based primarily from ground clutter can be identified. Thus, the processing electronics can determine if a radar return is ground clutter based on the comparison in step 901. In step 902, the processing electronics check to determine if the comparison of power versus tilt angle to the antenna beam-pattern is similar. If the power versus tilt angle is similar to the antenna beam-pattern, then the return is identified as ground clutter (step 906) by the processing electronics. If the power versus tilt angle is not similar to the antenna beam-pattern, then the return is identified as weather (step 904) by the processing electronics. Further, after the returns from ground clutter are identified, then the radar returns for a given range that have the shape of the antenna's beam-pattern are aligned with the tilt angles at which the data was taken (step 908). Thus, the effective (or measured) angle to the terrain can be determined (step 910) by the processing electronics. Preferably, the effective angle is such that the center tilt angle of the sampled data's shape is most closely matched up with the actual measured antenna's beam-pattern. Once the effective angle to terrain is calculated, the effective angle to terrain is compared to the expected angle to terrain (step 912) by the processing electronics. Based upon the comparison between effective and expected angles to terrain, the processing electronics calculate a correction for atmospheric refraction (step 914) for all qualified ranges. The correction can be calculated based on the variation between expected and effective angle to terrain. For example, a higher variation between expected and effective angles to terrain can indicate that a higher degree of angle correction is required to compensate for atmospheric refraction. Further, the correction can be an angular correction for refractive effects.

Once the processing electronics have calculated a correction for atmospheric refraction, the correction is applied (step 916) by the processing electronics. In addition to being used for an atmospheric refraction correction, the calculation can also be used to compute a new threshold for the ground clutter and weather separation process. Further, the calculation can additionally be used to correct altitude estimates for detected weather. Furthermore, the correction can be applied to ranges without qualified data using a curve fit or other predictive methods. The corrective factor can also be converted from an angular correction for refractive effects to an altitude correction, using basic geometry.

According to various exemplary embodiments, the process flow of FIGS. 1-9 may be embodied as hardware and/or software. In exemplary embodiments where the processes are embodied as software, the processes may be executed as computer code on any processing or hardware architecture or in any radar system.

While the detailed drawings, specific examples, detailed algorithms, and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. For example, the scope of the claims are intended to cover any technique that uses a single aperture antenna or a selectable fractional aperture antenna, or any other type of antenna, unless literally delineated in the claims. Furthermore, other substitutions, modifications, changes, and omissions may be made in the design, operating conditions, and arrangement of the exemplary embodiments without departing from the scope of the invention as expressed in the appended claims.

What is claimed is:

1. An aircraft weather radar system coupled to an antenna on the aircraft, the aircraft weather radar system comprising:
   an input for receiving data associated with weather radar returns received by the antenna; and
   processing electronics configured to perform a routine to analyze radar returns received at the input and associated with terrain using a model of refraction characteristics, wherein the returns from at least one radar beam are utilized to determine an angle and/or altitude of weather or terrain, and to create the model of the atmospheric refraction characteristics on the radar beam as a function of range.

2. The aircraft weather radar system of claim 1, wherein the atmospheric refraction characteristics are based on a change in reflectivity from terrain at multiple ranges.

3. The aircraft weather radar system of claim 1, wherein one or more antenna beams are vertically slewed or horizontally slewed.

4. The aircraft weather radar system of claim 1, wherein the radar returns are used to produce an angle estimate to weather or terrain that takes into account local refraction effects.

5. The aircraft weather radar system of claim 3, wherein the radar returns are used to produce an angle estimate to weather or terrain that takes into account local refraction effects.

6. The aircraft weather radar system of claim 1, wherein the input is an antenna, a memory, or transmit/receive circuit.

7. The aircraft weather radar system of claim 1, wherein the model is used to estimate atmospheric refraction effects for radar ranges that do not contain data suitable for direct measurement of atmospheric refraction.

8. An avionics system, the system comprising:
   means for receiving data associated with weather radar returns received by an antenna;
   means for performing a routine to determine weather radar returns associated with terrain, wherein the returns from at least one radar beam are utilized to determine an angle and/or altitude of weather or terrain, and to create a model of the atmospheric refraction effects on the radar beam as a function of range; and
   means for providing atmospheric refraction characteristics based on the model.

9. The avionics system of claim 8, wherein the atmospheric refraction characteristics are based on a change in reflectivity from terrain at multiple ranges.

10. The avionics system of claim 8, wherein one or more radar beams are vertically slewed or horizontally slewed.

11. The avionics system of claim 10, wherein the radar returns are used to produce an angle estimate to weather or terrain that takes into account local refraction effects.

12. The avionics system of claim 8, wherein the radar returns are used to produce an angle estimate to weather or terrain that takes into account local refraction effects.

13. The avionics system of claim 8, wherein the means for performing uses a compensated Earth model.

14. The avionics system of claim 8, wherein the model is used to estimate atmospheric refraction effects for radar ranges that do not contain data suitable for direct measurement of atmospheric refraction.

15. The aircraft weather radar system of claim 1, wherein the processing electronics use a compensated Earth radius model.

* * * * *